US012416568B2

(12) United States Patent
Olesen et al.

(10) Patent No.: US 12,416,568 B2
(45) Date of Patent: Sep. 16, 2025

(54) FLUID SAMPLE BIOLOGICAL ACTIVITY ANALYZING METHOD BY 3D IMAGING OF A FILTER AFTER PASSING THE SAMPLE THERETHROUGH

(71) Applicant: INTUBIO APS, Farum (DK)

(72) Inventors: Tom Olesen, Farum (DK); Niels Agersnap Larsen, Farum (DK)

(73) Assignee: INTUBIO APS, Farum (DK)

( * ) Notice: Subject to any disclaimer, the term of this patent is extended or adjusted under 35 U.S.C. 154(b) by 784 days.

(21) Appl. No.: 17/780,060

(22) PCT Filed: Nov. 27, 2020

(86) PCT No.: PCT/EP2020/083750
§ 371 (c)(1),
(2) Date: May 26, 2022

(87) PCT Pub. No.: WO2021/105439
PCT Pub. Date: Jun. 3, 2021

(65) Prior Publication Data
US 2023/0341318 A1    Oct. 26, 2023

(30) Foreign Application Priority Data
Nov. 29, 2019   (DK) ............................ PA 2019 01413

(51) Int. Cl.
*G01N 21/25*   (2006.01)
*G01N 21/31*   (2006.01)
*G01N 21/64*   (2006.01)

(52) U.S. Cl.
CPC ........... *G01N 21/253* (2013.01); *G01N 21/31* (2013.01); *G01N 2021/6419* (2013.01);
(Continued)

(58) Field of Classification Search
CPC .. G01N 21/31; G01N 21/253; G01N 21/6458; G01N 21/6452; G01N 21/6486; G01N 21/65
(Continued)

(56) References Cited

U.S. PATENT DOCUMENTS 3,741,877 A    6/1973   Shaufus et al.
4,049,589 A    9/1977   Sakane
(Continued)

FOREIGN PATENT DOCUMENTS

DE   102011083215 A1   3/2013
EP       4065958 B1    4/2025
(Continued)

OTHER PUBLICATIONS

Official Action in corresponding European Application No. 20816157.0 mailed on Mar. 12, 2024, 4 Pages.
(Continued)

*Primary Examiner* — Arlen Soderquist
(74) *Attorney, Agent, or Firm* — Boone IP Law

(57) ABSTRACT

A method and a system for analyzing a fluid sample for a biological activity. The method includes, providing a filter unit including a membrane having a front face and a rear face, passing the fluid sample through the filter membrane from its front face, applying the filter unit in a container, adding a medium into the container, and performing a scanning and image analyzing procedure of the filter membrane using at least one selected scanning wavelength. The scanning is an optical 3D scanning and includes acquiring a plurality of images along at least one scanning path.

19 Claims, 11 Drawing Sheets

(52) U.S. Cl.
CPC ..... *G01N 21/6452* (2013.01); *G01N 21/6458* (2013.01); *G01N 21/6486* (2013.01); *G01N 2201/10* (2013.01)

(58) Field of Classification Search
USPC ......................................... 422/82.05; 436/63
See application file for complete search history.

(56) References Cited

U.S. PATENT DOCUMENTS

| | | |
|---|---|---|
| 6,779,411 B1 | 8/2004 | Spurgeon |
| 2003/0138139 A1 | 7/2003 | Strom |
| 2005/0202523 A1 | 9/2005 | Shaw et al. |
| 2008/0003610 A1 | 1/2008 | Frank et al. |
| 2008/0293091 A1 | 11/2008 | Kanipayor et al. |
| 2011/0220818 A1 | 9/2011 | Stallinga et al. |
| 2011/0261164 A1 | 10/2011 | Olesen et al. |
| 2011/0315625 A1 | 12/2011 | Keenan et al. |
| 2012/0244519 A1 | 9/2012 | Olesen et al. |
| 2013/0075286 A1 | 3/2013 | Gumbrecht et al. |
| 2014/0038277 A1 | 2/2014 | Babico et al. |
| 2014/0335558 A1 | 11/2014 | Hyman et al. |
| 2014/0342397 A1 | 11/2014 | Andersen Gad et al. |
| 2016/0069786 A1 | 3/2016 | Berg et al. |
| 2017/0350800 A1 | 12/2017 | Dahlqvist et al. |
| 2023/0088043 A1* | 3/2023 | Kovacs ................ G01N 35/028 435/6.11 |

FOREIGN PATENT DOCUMENTS

| | | |
|---|---|---|
| WO | 2011072698 A1 | 6/2011 |
| WO | 2017116695 A1 | 7/2017 |
| WO | 2018157048 A1 | 8/2018 |

OTHER PUBLICATIONS

Danish Search Report dated May 18, 2020, issued in corresponding Danish Patent Application No. PA 2019 01413. (7 pages).

Yang, et al."Optical properties of Teflon AF amorphous fluoropolymers", J. Micro/Nanolith. MEMS MOEMS, vol. 7, No. 3, 033010, (Jul.-Sep. 2008).

International Search Report (PCT/ISA/210) and Written Opinion (PCT/ISA/237) mailed on Feb. 9, 2021, by the European Patent Office as the International Searching Authority for International Application No. PCT/EP2020/083750. (12 pages).

* cited by examiner

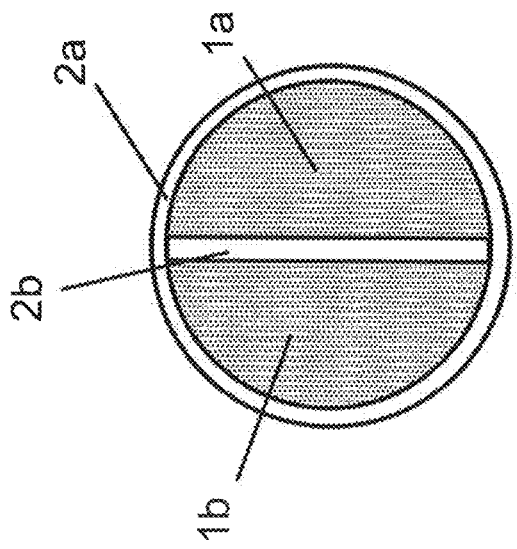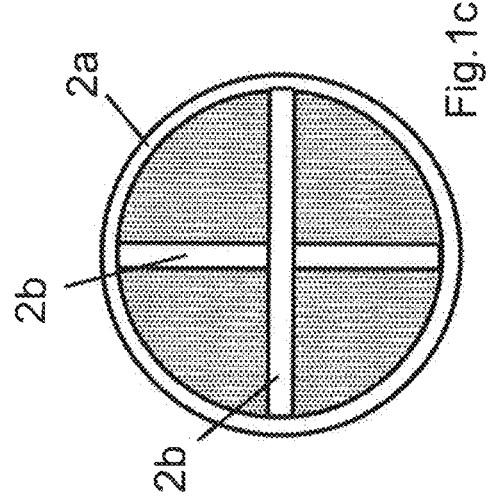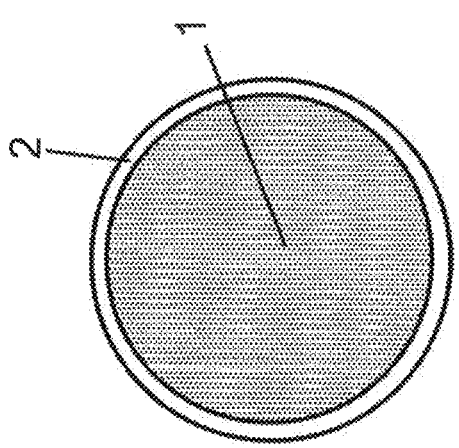

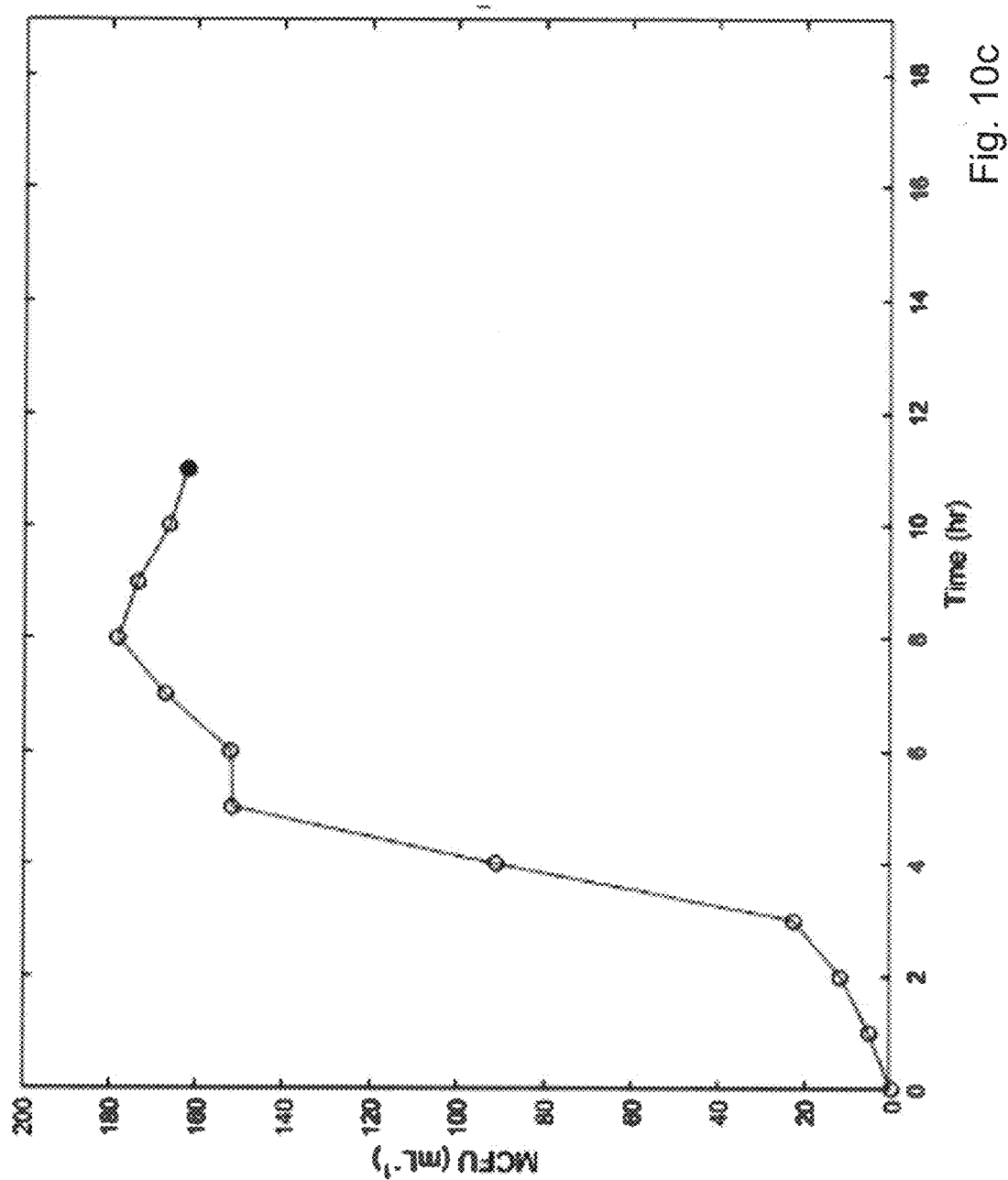

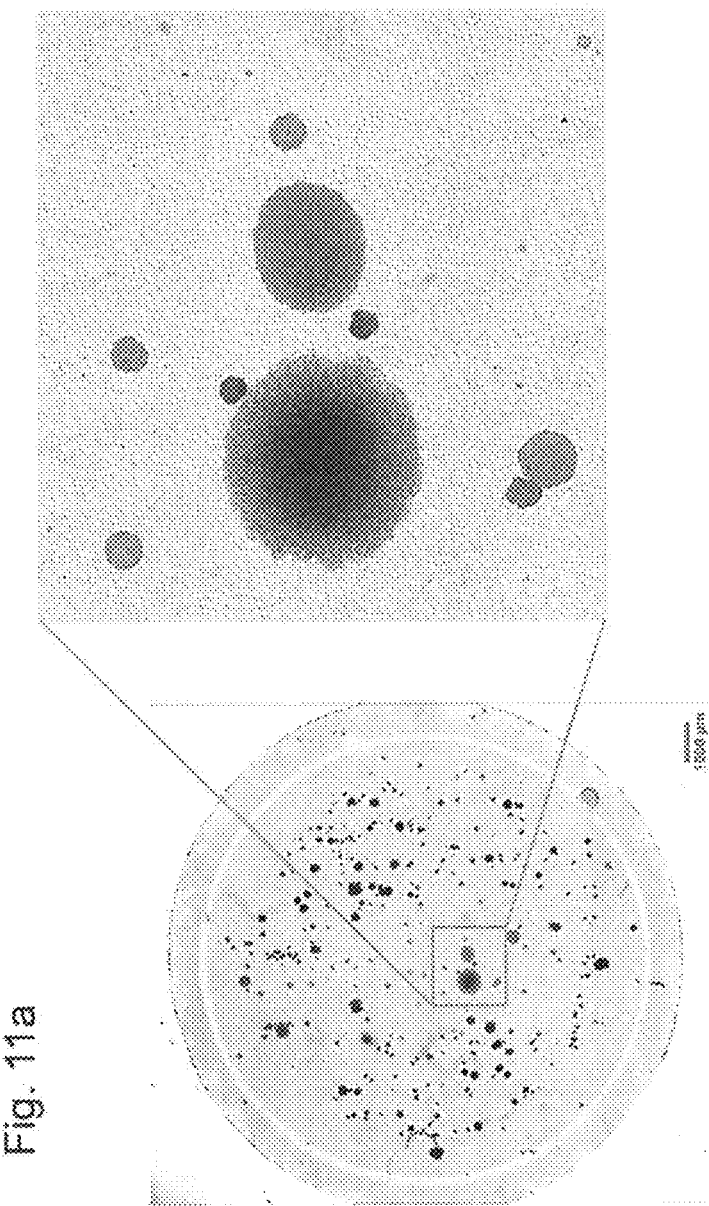

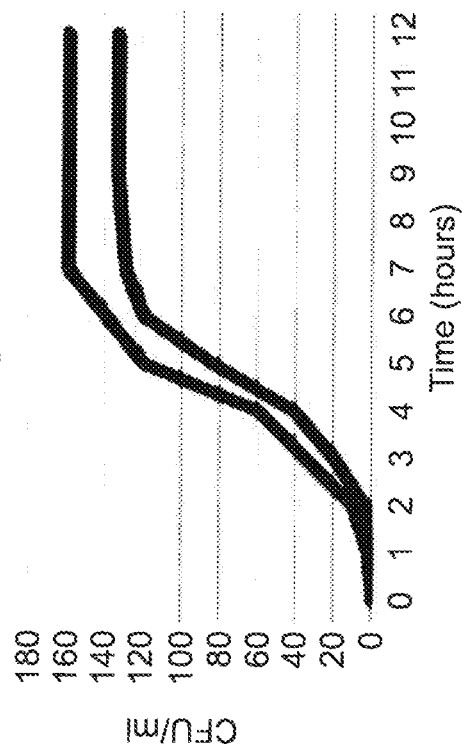
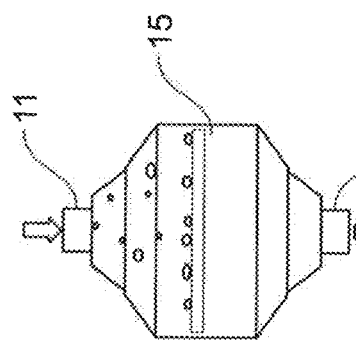
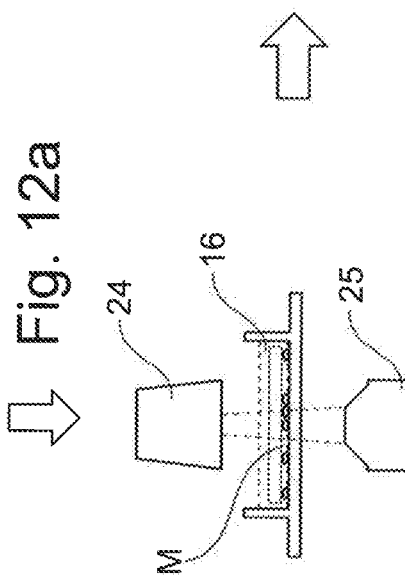
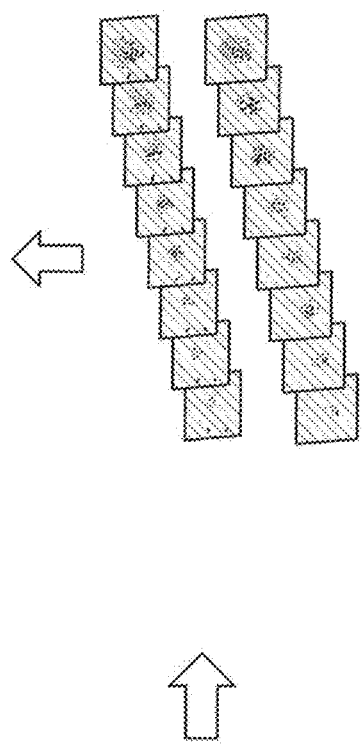
Fig. 12d
Fig. 12c
Fig. 12a
Fig. 12b

FLUID SAMPLE BIOLOGICAL ACTIVITY ANALYZING METHOD BY 3D IMAGING OF A FILTER AFTER PASSING THE SAMPLE THERETHROUGH

TECHNICAL FIELD

The present invention relates to a system and a method for analyzing a fluid sample for a biological activity for example for determining presence, concentration and/or activity of a microorganism and/or for determining one or more characteristics of a microorganism.

BACKGROUND

Examination for microorganism and biological activity is used in many different fluids or fluid extracts of solids. For example, it is common to examining water for parasites, biological fluids are examined for disease associated microorganisms, building elements are examined for fungal growth and foods are examined for microbial growth. Also, in industrial processes, it is standard to perform various examinations for microorganism, including qualitative and quantitative examinations.

Many of such examinations are performed in laboratories, by take samples and incubating the sample on or in a medium until the microorganism may be identified. Such examinations often take several days and are very labor consuming. In addition, the concentration of the microorganism may be very low, which requires up-concentrating the sample prior to examination.

In many situations it is very important that the examination is both fast and accurate. For example, if drinking water has been polluted with a high level of microorganisms such as E. coli, it is utmost important to stop the supply immediately to avoid polluting the pipes and avoid protect people from becoming sick of the water.

US2014342397 discloses a device and a method for detecting particles, in particular parasites, in water adapted to on-line application. The method comprises passing at least a part of the water through a filter; applying indirect sonication with ultrasound to the filter to release parasites, which have been collected in the filter without disrupting the parasites; collecting parasites for detection; and detecting the collected parasites. This serves to collect parasites in the filter and/or increase the concentration of parasites before the filter and/or disrupt aggregates without disrupting the parasites per se.

US2011315625 discloses a method and devices for detecting microorganisms, such as yeast and bacteria in mixtures, are disclosed. Methods include passing a sample mixture through a filter device, which has been pretreated with detergent resuspending the filtrand from the filter membranes and detecting the presence of microorganisms in the filtrand.

U.S. Pat. No. 3,741,877 discloses a construction for collecting and growing microorganisms obtained from an aqueous solution comprising a filter sealed to one surface of an absorbent pad containing a nutrient for the micro-organisms. The microorganisms in aqueous solution are filtered through the filter under the capillary action of the pad. The microorganisms are deposited on the filter and the aqueous solution passed into the pad provides a vehicle for contacting the nutrient and organisms.

DISCLOSURE OF INVENTION

An objective of the invention is to provide a system and a method for analyzing a fluid sample for a biological activity, which is fast, simple to handle, have a high accuracy and have a high sensitivity.

In an embodiment, it is an objective to provide a system and a method for analyzing a fluid sample for a biological activity, which is capable of performing a very accurate analysis even where the concentration of microorganism is very low.

In an embodiment, it is an objective to provide a system and a method for analyzing a fluid sample for a biological activity, by use of which one or more characteristics of the microorganism may be determined.

These and other objects have been solved by the invention as defined in the claims and as described herein below.

It has been found that the invention or embodiments thereof have a number of additional advantages, which will be clear to the skilled person from the following description.

The method for analyzing a fluid sample for a biological activity has been found to be very fast and accurate. The method comprises
  providing a filter unit comprising a membrane having a front face and a rear face,
  passing the fluid sample through the filter membrane from its front face,
  applying the filter unit in a container,
  adding a medium into the container, and
  performing a scanning and image analyzing procedure of the filter membrane using at least one selected scanning wavelength.

The scanning is an optical 3D scanning and comprises acquiring a plurality of images along at least one scanning path.

The method may be applied for determining biological activity even where the concentration of microorganism in the fluid sample is very small. The sample may be as large as desired e.g. from a few μL and up to many liters, such as from 0.1 ml to about 100 L, such as from 0.5 mL to 500 mL. A typical sample size will be from about 1 mL to about 100 mL.

The fluid sample may be a sample comprising fluid liquid and/or gas.

The fluid sample may for example be passed through the filter membrane, by pressing the fluid sample through the filter membrane, by suction e.g. by applying a reduced pressure (e.g. a vacuum) at the side of the filter membrane rear face, by pumping and/or by centrifugation.

Microorganism in the fluid sample is collected on and/or in the filter membrane and by subjecting the microorganism collected by the filter membrane to the medium and thereafter scanning the filter membrane, it may very fast be determined if microorganism has been collected in and/or on the filter membrane and advantageously the quantity and/or quality (alive or dead) of the collected microorganism may be determined and from this the concentration of microorganism in the liquid sample may be determined.

The front face of the filter is the filter face from where the fluid passes into the filter and the rear face of the filter is the face opposite to the front face.

Usually the major part of the filtrate is collected at the front face of the filter, whereas small particles, such as some microorganism may pass into and captured in the filer membrane.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Reference made to "some embodiments" or "an embodiment" means that a particular feature, structure, or characteristic described in connection with such embodiment(s) is included in at least one embodiment of the subject matter disclosed. Thus, the appearance of the phrases "in some embodiments" or "in an embodiment" in various places throughout the specification is not necessarily referring to the same embodiment(s). Further, the skilled person will understand that particular features, structures, or characteristics may be combined in any suitable manner within the scope of the invention as defined by the claims.

The term "substantially" should herein be taken to mean that ordinary product variances and tolerances are comprised.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

The sample may comprise liquid and/or gas. Advantageous the sample in an aqueous based sample. The sample may advantageously be a sample selected from wastewater, surface water, drinking water, wash water, fluid food, human or animal fluids e.g. saliva or urine or any sample comprising a fraction of any of these. Other examples of samples includes exudate, such as wound exudate and samples scraped from skin and mixed with liquid, e.g. water.

The scanning and image analyzing procedure may be performed using any scanning and analyzing procedure adapted to the method of the invention. Example of scanning and image analyzing procedures which may be applied are described in for example in US2016069786A, WO11072698A1, US2011261164A, US2017350800A and/or US2003138139A, wherein the scanning and image analyzing procedure is modified to perform the 3D scanning of the filter membrane, and preferably such that the 3D scanning comprises at least a part of the thickness of the filter membrane and advantageously at least a layer of the medium at the front face of the filter membrane.

In an embodiment, the scanning is or comprises a time-lapse series scanning. The time-lapse series scanning may for example comprise performing consecutive scans with a first time delay between each scan and thereafter running the images or processed images of the respective scans with a second time delay, which is advantageously shorter than the first time delay. For example, the respective consecutive scans may be performed with about 1 minute to 2 hour between each scan and the images or processed image(s) of the respective scans may be run e.g. by displaying immediately after each other, e.g. with a second time delay of 1 to 30 seconds.

In an embodiment, the time-lapse series scanning comprises comparing each of a number of subsequent scans with one or more scans that is/are previous scan(s) to the respective subsequent scan.

In an embodiment, the time-lapse series scanning comprises comparing historical image(s) with later acquired image(s).

It has been found that by consecutively comparing a latest acquired with one or more previous scan(s), such as including the immediately previous scan, a surprisingly fast determination of biological activity may be obtained.

Advantageously the filter membrane is at least partly transparent for at least one scanning wavelength. It has been that the filter membrane need not be fully transparent. Advantageously filter membrane is at least about 2% transparent for the selected scanning wavelength when immersed in water or immersed in the medium. The immersing in the water or the medium should advantageously be just sufficient to cover the filter membrane.

The filter membrane may advantageously be embedded in the medium.

The transparency may be determined by emitting a light beam comprising the selected scanning wavelength towards the front face of the membrane at an angle of about 90 degrees (normal incidence) and determine the percentage of the selected scanning wavelength passing through the membrane.

Where the transparency is very low, another scanning wavelength or several scanning wavelengths may be selected. In addition, or alternatively the intensity of the at least one selected scanning wavelength may be increased.

Preferably, the filter membrane is at least about 10% transparent, such as at least about 50% transparent for the selected scanning wavelength(s) when immersed in water or immersed in the medium.

It has been found that the analyzing for biological activity in particular will be accurate, effective and fast where the refractive index of the filter membrane material is relatively near to refractive index of the medium at the selected scanning wavelength(s). Where the filter membrane is not immersed in the medium, the light waves may be scattered in many directions due to the small openings in the filter membrane. However, when the filter membrane is immersed in the medium with a refractive index relatively near to the refractive index of the filter membrane at the selected scanning wavelength(s), the filter membrane may become substantially invisible at least at that or these scanning wavelength(s)

In an embodiment, the filter membrane is of a material having a refractive index of less than about 1.5, such as between 1.25 and 1.38, such as between 1.3 and 1.35 at the selected scanning wavelength(s).

In an embodiment, the filter membrane has a refractive index of less than about 1.5, such as between 1.25 and 1.38, such as between 1.3 and 1.35 at the wavelength 589.29 nm.

Preferably the filter membrane is of a material having a filter membrane refractive index and the medium has a medium refractive index where the refractive index difference (RID) between the filter membrane reference index and the RID is less than about 0.35, such as less than about 0.1, such as less than about 0.05, such as less than about 0.025, such as less than about 0.01 at the selected scanning wavelength and/or at the wavelength 589.29 nm. It has been found that the low RID is especially beneficial for fast detection of biological activity. For example, the scanning may start immediately after the filter membrane has been brought into contact with and embedded in the medium i.e. omitting intermediate incubation.

In an embodiment, the biological activity may be determined within few hours. Advantageously the filter membrane has a transparency and a refractive index selected such that when the filter membrane is immersed in the medium a scanning and image analyzing procedure, comprising a wave property scanning selected from a scanning of phase velocity, group velocity dispersion, wave dispersion, wave front, wave phase, group delay dispersion or time-of flight of at least one wavelength will reveal if a microorganism with a thickness of 0.6-0.7 µm is present on the membrane or not.

Hence, if a microorganism changes at least one of the wave properties phase velocity, group velocity dispersion, wave dispersion, wave phase, wave front, wave phase, group delay dispersion or time-of flight for a selected scanning wavelength, then the filter membrane may be suitable for performing the method of the invention.

This may be determined by comparing a scan of phase velocity, group velocity dispersion, wave dispersion, wave front, wave phase, group delay dispersion or time-of flight for the selected scanning wavelength the microorganism is present with a corresponding scan where the microorganism is not present. The microorganism may e.g. be an *Escherichia coli*.

Thus, in an embodiment the method comprises analyzing for biological activity using scans of phase velocity, group velocity dispersion, wave dispersion, wave front, wave phase, group delay dispersion or time-of flight.

Advantageously the at least one selected scanning wavelength comprises a plurality of scanning wavelengths, such as a range of wavelengths and/or two or more discrete wavelengths. Thereby it will be simpler to perform a morphologic analysis of the microorganism(s).

Preferably, the scanning is performed in a scanning depth of at least about 0.05 µm, such as from about 1 µm to about 5 mm, such as from about 5 µm to about 3 mm.

Thereby microorganism(s) captured within the filter membrane may be analyzed. Heretofore, it has never been suggested to analyze microorganism(s) captured within a filter membrane. Since microorganism(s) in a sample may have many sizes, it is very likely that such microorganism may be captured within the filter membrane. The method including analyzing microorganism(s) captured within the filter membrane is therefore even more accurate. In addition, quantitative determinations of the number of microorganisms may be obtained with a very high accuracy.

In an embodiment the microorganism comprises fungus and or virus and or bacteriophage.

In an embodiment, the method comprises performing an assay for detection or quantification of virus.

A) Potential virus content in a liquid sample is retained on a filter membrane by filtration. The filter with the trapped virus is placed on a preferred confluent monolayer of host cells and covered by solidifying medium. The host cells are e.g. bacteria for bacteriophages or for virus.

B) A liquid sample potentially with virus is mixed with host cells and retained on a filter membrane by filtration. The filter with the trapped virus and cells is placed on a solidified medium or direct on a transparent window and covered by solidifying medium.

C) Potentially virus infected cells are retained on a filter membrane by filtration. The filter with the trapped cells is placed on a solidified medium or direct on a transparent window and covered by solidifying medium.

The cells are continuously monitored for infectious unit in its initiate lytic cycle. The migration of infectious virus from the initially infected host cell to the surrounding cells results in the lysis of the cells in the vicinity, forming the plaque. This is called a Plaque Forming Units (PFU) and usually appears clear as this region contains destroyed cells.

In some cases a virus does not kill the host cells but may form visible groups of infected cells (denoted foci) and enumerated as focus-forming units (FFUs).

Advantageously the 3D scanning comprises scanning through at least a part of the filter membrane thickness.

Preferably, the scanning comprises scanning through the entire filter membrane thickness.

In an embodiment, the 3D scanning comprises scanning through the entire filter membrane thickness and including at least a volume of the medium located adjacent the front face of the membrane and optionally a volume of the medium located adjacent the rear face of the medium.

Filtrate including living microorganism may be trapped within the thickness of the filter membrane i.e. between its front and rear faces. By index matching the material of the filter membrane and the medium, it is now possibly to have optical access to the filtrate trapped within the filter membrane and even objects located on the rear side of the membrane side. Thus, detection of biological activity becomes insensitive to filter surface orientation (up/down).

However, orientation may matter when the method comprises determining of growth of a colony of microorganism. When the filter membrane front face, faces the bottom of the container, a limited volume of medium may be located between the container bottom and the filter. The colony may be limited to growth in this volume, since it may be difficult for the colony to grow into the filter membrane. Whereas a microorganism may grow inside the filter membrane, the limited space in the membrane may result in a limited growth.

Hence, where the biological activity comprises activity of one or more microorganism colonies, it may be advantageously that the front face of the filter membrane faces away from the container bottom.

In an embodiment, the filter membrane front face, faces the bottom of the container, and growth of microorganism(s) located on the front face is limited to a thin medium layer geometrically defined by the bottom of the container and the filter front face. The volume to be scanned will then be rather small and therefore any growth and biological activity may quickly be determined. This starting point may be fine for CFU determination as a colony may be measurable already after a few cell divisions.

In certain type determinations of colonies, it may be advantageous to allow growth to occur into a larger thickness of the medium, such that the colonies are given the freedom to form 3D formations, which 3D formations may be used for typing determination of the microorganism. However, it does not rule out that thin-layer growth may produce colony formations (in 2D) suitable for type differentiation and type determination.

In addition, it may be advantageous to have the biological activity as close to the window (such as the bottom of the container or a lid through which the scanning images are obtained) as possible: For typical imaging systems, point distortion increases with longer optical path through the window and the medium that is between the activity and the window. I.e. distortion may be minimized by making this optical path small.

In an embodiment, the entire filter membrane including filtrate and surrounding thin layer medium are subject to 3D scanning microscopy and image analysis. The medium is advantageously included, specifically where it is functionalized with indicative substances, which e.g. results in color changes by selected activities. For example, chromogenic medium may result in local color response to specific enzymes secreted by bacteria, archaea (bacterial bacteria) and fungi.

The scanning may be performed using a scanner comprising a light emitter and an image acquisition device, wherein the image acquisition device has an optical axis.

The scanning path may have any angle to the optical axis, however it is preferred that the scanning path, which is substantially orthogonal to the optical axis.

In an embodiment, the e scanning path may be coincident with the optical axis. In an embodiment, the scanning path has an angle to the optical axis of up to about 45 degrees, such as up to about 30 degrees, such, as up to about 15 degrees, such, as up to about 10 degrees, such, as up to about 5 degrees, such, as up to about 2.5 degrees, such, as up to about 1 degrees.

Advantageously the light emitter has a center axis arranged with an angle to the front/rear face of the filter membrane which is up to about 45 degrees, such as up to about 30 degrees, such as up to about 15 degrees, such, as up to about 10 degrees, such, as up to about 5 degrees, such, as up to about 2.5 degrees, such, as up to about 1 degrees. The image acquisition device may advantageously be tilted relative to the filter membrane front/rear face with a corresponding degree.

The scanning and image analyzing procedure advantageously comprises performing consecutively scans along the scanning path and for each scan generating a set of acquired images. The scan may be performed immediately after one another or there may be a time delay between the respective scans. The time delay may e.g. depend on any difference between preceding scans, so that the frequency of scans is increased where the biological activity is higher compared to where less biological activity has been observed.

Advantageously, the scanning and image analyzing procedure comprises performing a background scan along the scanning path and generating a set of background images. These background images or one more synthesized images comprises data from these background images may be The set of background images is preferably generated as early as possible after having added the medium into the container. Preferably within 20 min, such as within 10 min, such as within 5 min, such as within 1 min.

In an embodiment, the scanning and image analyzing procedure comprises processing each set of acquired images by a method comprising subtracting pixel values of the respective background images from corresponding pixel values of the respective acquired images of the set of acquired images.

Thereby any changes due to biological activity will be very fast detected and may be shown with high accuracy. Noise due to minor flaws of the filter membrane ads well as small differences in refractive index between the filter membrane material and the medium may be suppressed.

The scanning and image analyzing procedure may comprise synthesizing resulting image(s) from the respective sets of acquired images. The synthesizing may comprise generating image(s) seen from another view point, such as from 90 degrees to the filter front, merging parts of, or entire images, for example such that all biological activity for a section of the filter membrane and in the entire depth of the filter membrane may be seen in one image. In an embodiment, each resulting image predominantly is synthesized from one set of acquired images. Preferably, each resulting image is synthesized from one set of acquired images and optionally up to 10% of replacement image of previously acquired images.

Each set of acquired images may advantageously be associated with a time attribute representing the time of acquiring a selected one of the images, for example the time for acquisition of the first image of a scan or the time of acquisition the last or any other preselected image of a scan.

Thereby the sets of image(s) generated from the consecutive scans may be provided to represent sets of acquired images as a function of time.

In an embodiment, each of the resulting images is associated with the time attribute of the sets of acquired images predominantly used for synthesizing of the image. Thereby each image and each synthesized image is associated to a time attribute, which makes it simpler to order the images to determine a biological activity.

The scanning and image analyzing procedure may in principle be performed using any kind of microscopy technique. For example, the scanning and image analyzing procedure may comprise bright field microscopy, dark field microscopy, phase contrast microscopy and/or fluorescence microscopy.

In an embodiment, the scanning and image analyzing procedure comprises oblique illumination, off-axis illumination, multi-axis illumination (e.g. dual-axis illumination) and/or in-line illumination, optionally the illumination may differ from one scan to a next scan.

In an embodiment, the scanning and image analyzing procedure comprises light transmission scanning and/or light reflection scanning.

In an embodiment, the scanning and image analyzing procedure comprises hyperspectral scanning and imaging.

Hyperspectral scanning has been found to be very beneficial in the present method. Hyperspectral scanning includes scanning it a plurality of selected scanning wavelength(s). Sensors may collect information as wavelength sets of images, where each image represents a narrow wavelength range of the electromagnetic spectrum, also known as a spectral band. These 'images' are combined to form a three-dimensional (x, y, λ) hyperspectral data cube for processing and analysis, where x and y represent two spatial dimensions of the scene, and λ represents the spectral dimension (comprising a range of wavelengths).

The precision of these sensors may be measured in spectral resolution, which is the width of each band of the spectrum that is captured. If the scanner detects a large number of fairly narrow frequency bands, it is possible to identify objects even if they are only captured in a handful of pixels.

In an embodiment, the scanning and image analyzing procedure comprises a wave property scanning of at least one wavelength, wherein the wave property comprises a property of the at least one wavelength, which property depends on the material it passes through. Examples of wave properties comprises phase velocity, group velocity dispersion, wave dispersion, wave front, wave phase, group delay dispersion, time-of flight or any combinations thereof.

The wave property scanning may be used to very fast detect if any particles or microorganism have been captured by the filter membrane. For characterizing microorganism(s) it may be preferred to use a selected scanning wavelength(s) in the visible range.

Time of flight is the measurement of the time taken by an object, particle or wave to travel a distance through a medium or the time it takes to be reflected. If the filter is at least partly transparent for the wavelength and a captured particle/microorganism has no or another degree of transparency for the wavelength, this will be detected by the time of flight scanner.

Where the wave property scanning includes a wavefront scanning a wavefront sensor may be applied for measure any wavefront aberration in the detected light signal from the light with the selected scanning wavelength after it has passed through the filter membrane. If the wavefront aberration increases from one scan to a subsequent scan this indicates that there is biological activity.

In an embodiment, the wave property scanning comprises acquiring a plurality of wave property images along a scanning path, such as the at least one scanning path.

Advantageously the scanning and image analyzing procedure comprises performing a wave property background scan along the scanning path and generating a set of background wave property images and comparing at least one of the acquired wave property images with a corresponding image of the background wave property images.

The at least one selected scanning wavelength may in principle include any wavelengths that does not prevent biological activity e.g. by killing the microorganism. The at least one selected wavelength may for example comprises one or more wavelength in the range 200 nm to 1200 nm, such as at least one wavelength in the visible range from 380 nm to 740 nm, such as from 450 nm to 700 nm.

The desired wavelength depends on which microorganism is expected to be found in/on the filter membrane. It may be desired to use a combination of selected scanning wavelength(s) e.g. a wavelength around 700 nm and another wavelength around 400 nm and etc.

Where the microorganism(s) may generate a color reaction, the at least one selected wavelength preferably comprises a wavelength of the color in question. The medium may for example be selected such that a living microorganism will form a color or change a color e.g. due to a change of pH value.

Wavelengths in the UV range may damage microorganism and the intensity or time of using wavelength in this range may therefore be limited. However, some microorganisms are more resistant to wavelength in the UV range than other and this factor may for example be used to characterize a microorganism.

The at least one selected wavelength may advantageously be selected in dependence on the medium used Mediums are often yellowish in color and may have high absorbance at wavelengths below 500 nm.

The medium may or may not absorb some of the scanning light including the at least one selected scanning wavelength. Where the medium and/or the container bottom and/or the filter is absorbing light of the at least one selected scanning wavelength the intensity of the selected scanning wavelength is advantageously adjusted to ensure that the acquired image is sufficiently clear, e.g. by increasing the intensity to compensate for the loss of light due the absorbance.

In an embodiment, the at least one selected wavelength comprises one or more excitation wavelength for excitation of a fluorophore, such as a fluorophore present in the medium, fluorophore expected to be generated in the medium upon microbial activation and/or a fluorophore of a biofluorescence active microorganism expected in the sample.

In an embodiment, the scanning and image analyzing procedure comprises hyperspectral microscopy and/or Raman spectroscopy.

The scanning and image analyzing procedure may advantageously comprise determining at least one morphological parameter of one or more microorganism and/or colonies, such as size, shape and/or texture. For determining at least one morphological parameter it may be desired to applied at least one selected scanning wavelength in the visible range e.g. from about 450 nm to about 750 nm In an embodiment, the scanning and image analyzing procedure comprises determining at least one temporal parameter, such as temporal changes of number, size shape and/or texture of one or more microorganism and/or colonies.

The 3D scanning may advantageously be performed using two or more selected scanning wavelength and wherein the image analyzing procedure comprises a spectral analysis, such as a multiplexing between the two or more wavelength The steps of applying the filter unit in a container and adding a medium into the container, may be performed in any order. In an embodiment, the medium is added both before and after applying the filter unit in the container.

In an embodiment, at least a part of the medium is added prior to applying the filter unit in the container.

In an embodiment, the medium is precasted in the container and the filter unit is placed in the container onto the precast medium with its front face away from the medium. The medium penetrates the filter membrane so it can be reached by microorganism captured on and in the filter membrane.

The filter may be embedded in the medium.

In an embodiment, at least a part of the medium is added after application of the filter unit in the container.

The container comprises a bottom and a wall preferably defining an open top. Preferably the 3D scanning is performed from the open top. Thereby any absorption, reflection or scattering of light due to the material of the container may be avoided.

The scanning may be performed from the top even where the filter membrane front face is facing the bottom. The scanning may comprise scanning through the filter membrane in its entire thickness.

In an embodiment, the application of the filter unit in the container comprises applying the filter unit in the container with the front face of the filter membrane facing a bottom of the container.

In an embodiment, the application of the filter unit in the container comprises applying the filter unit in the container with the rear face of the filter membrane facing a bottom of the container.

Where the scanning is performed from the bottom the bottom of the container is at least partly transparent for the selected scanning wavelength(s). In an embodiment, the container bottom is at least 50% transparent for the selected scanning wavelength.

In an embodiment, scanning is performed from the front face of the filter membrane.

In an embodiment, scanning is performed from the rear face of the filter membrane.

Advantageously the medium is added in liquid form.

The medium may be any kind of medium suitable for growing of and/or testing microorganism.

In an embodiment, the medium is nutrient broth and/or agar.

Example of media includes the following:

Nutrient media—A source of amino acids and nitrogen (e.g., beef, yeast extract). This is an undefined medium because the amino acid source contains a variety of compounds with the exact composition being unknown. These media contain all the elements that most bacteria need for growth and are non-selective, so they are used for the general cultivation and maintenance of bacteria kept in laboratory-culture collections.

Minimal media—Media that contains the minimum nutrients possible for colony growth, generally without the presence of amino acids, and are often used by microbiologists and geneticists to grow "wild type" microorganisms. These media can also be used to select for or against the growth of specific microbes. Usually a fair amount of information must be known about the microbe to determine its minimal media requirements.

Selective media—Used for the growth of only selected microorganisms. For example, if a microorganism is resistant to a certain antibiotic, such as ampicillin or tetracycline, then that antibiotic can be added to the medium in order to prevent other microorganisms, which do not possess the resistance, from growing.

Differential media—Also known as indicator media, are used to distinguish one microorganism type from another growing on the same media. This type of media uses the biochemical characteristics of a microorganism growing in the presence of specific nutrients or indicators (such as neutral red, phenol red, eosin y, or methylene blue) added to the medium to visibly indicate the defining characteristics of a microorganism. This type of media is used for the detection and identification of microorganisms.

In an embodiment, the medium is a medium that changes optically due to microbial activity.

In an embodiment, the medium is a chromogenic medium, such as a chromogenic medium that locally changes color depending on whether it is coliform and *E coli* bacteria. These secretes different enzymes. Coliform secretes beta-d-galactosidase which turns the medium red and *E coli* secretes both beta-d-galactosidase and beta-d-glucuronidase which turns the medium blue.

The method may further comprise adding an additional substance to the container, the additional substance is preferably a biocide and/or an antibiotic. Thereby a microorganism or a colonies reaction to the additional substance may be determined, which may give additional information about the microorganism(s).

In an embodiment, the medium may comprise one or more sub-cultures, one or more sub-cultures may be added to the medium and/or onto the filter membrane. The sub-culture(s) may advantageously be a microorganism that promote growth of a target microorganism or a microorganism that suppresses growth of a target microorganism, e.g. by compete with the target microorganism or by producing a substances that is growth suppressing for the target microorganism, such as toxic to the target microorganism.

Target microorganism is used to designate a microorganism that is tested for in the fluid sample.

The sub-culture(s) may e.g. be added to the fluid sample prior to filtering.

In an embodiment, the sub-culture(s) is/are added immediately after having passed the sample through the filter membrane e.g. by passing a fluid volume comprising the sub-culture(s) through the filter membrane.

In an embodiment, the sub-culture(s) is/are added to the filter membrane immediately after the filter membrane has been applied in contact with the medium.

In an embodiment, the sub-culture(s) is/are added to the filter membrane after the filter membrane has been applied in contact with the medium and a first sign of biological activity on the filter membrane has been observed.

In an embodiment, the method comprises testing if a treatment agent has a desired effect for treating an infection or a microbiome imbalance at a body location of a patient, wherein the sample comprises a sample from said body location, such as a fluid sample, urine, saliva wound secrete etc. and/or cells suspended in fluid. The treatment agent is added to the sample, to the medium and or to the filter as described for adding sub-culture(s) above. Any effect of the treatment agent may be observed as a change of biological activity relative to a correspondent procedure omitting said treatment agent. The treatment agent may for example be one or more probiotics, such as lactobacteria.

Thereby, it may be tested if a treatment agent has a desired effect before using it. For example it may be tested if a probiotic skincare and/or wound care treatment agent has a desired effect before applying it to the patient.

In an embodiment, the method comprises determining number of living microorganism and/or colonies on and in the filter membrane and correlating this number to the liquid sample volume, to determine number of microorganism per volume unit.

The method of the invention has been found to very useful for determining a characteristic as a function of time of the filtrate on the front face of the filter membrane. Change due to biological activity may be determined with high accuracy as a function of time and thereby the method may comprise determining of characteristics of one or more microorganism e.g. as a reaction to a medium and/or an additional added substance.

In an embodiment, the scanning and image analyzing procedure comprises performing the consecutive scans and generation of sets of acquired images, wherein a first scan is a reference scan, after each subsequent scan processing the subsequent set of acquired images by a method comprising withdrawing pixel values of respective background images from corresponding pixel values of the respective images of the set of subsequent acquired images, synthesizing at least one resulting image and analyzing the resulting image for indication of living microorganism and/or a characteristics of a detected living microorganism.

In an embodiment, the method comprises analyzing a plurality of fluid samples obtained from the same mother sample, wherein at least two of the liquid samples are subjected to different medium and/or additional substance. The method may comprise comparing resulting images from the analysis of the respective fluid samples. Preferably the method comprises comparing timely corresponding resulting images from the analysis of the respective fluid samples.

The medium and/or added sub-cultures may aid to identify a detected living microorganism. In addition a detected microorganism may be identifiable directly from its growth pattern, shape or size. In an embodiment, one or more detected microorganisms may be subjected to further identification. In an embodiment, the method comprises picking microorganism(s) from one or more colonies, e.g. using picking methods, such as it is known from picking from traditional agar plates. The picked microorganism(s) may then be subjected to further step(s) of identification.

In an embodiment, the method comprises, withdrawing the entire filter membrane or a portion thereof and subjecting it to additional step(s) of identification of the microorganism located thereon. The additional step(s) of identification of the microorganism may for example comprise Polymerase Chain Reaction (PCR), and/or a matrix-assisted laser desorption/ionization (MALDI) analysis e.g. using time-of-flight mass spectrometer (MALDI-TOF). Where the sample comprises large particles or other solid or semisolid matter it may be desired to prefiltering the sample In an embodiment, the method comprises a two-step filtering, the method comprises providing a pre-filtering filter unit with a pre-filtering membrane having a front face and a rear face, pressing the fluid sample through the pre-filtering membrane from its front face prior to pressing the sample through the filter membrane, wherein the pre-filtering membrane has a larger cut-off particle size that the filter membrane.

After pre-filtering, the pre-filtering filter unit may be discarded or the method may comprise analyzing the pre-filtering filter unit after the filtering process, wherein the analyzing comprises applying the pre-filtering filter unit in a container,
adding a medium into the container, and
performing a scanning and image analyzing procedure of the filter membrane of the ore-filtering unit using at least one selected scanning, and wherein the scanning is an optical 3D scanning and comprises acquiring a plurality of images along a scanning path.

The pre-filtering filter unit filter membrane may be analyzed by a method as described herein for analyzing the filter membrane of the filter unit.

The method may advantageously be performed using the system described herein.

The invention also comprises a system for analyzing a fluid sample for a biological activity. The system comprises a filter unit, comprising a membrane having a front face and a rear face and a filter collar arrangement surrounding the membrane,
a filter housing adapted for holding the filter unit in a temporarily fixed position, and
a container adapted for the filter unit, wherein the filter housing comprises an inlet for feeding a fluid sample into the housing and through the filter membrane when the filter unit is in its temporarily fixed position, and wherein the filter unit is adapted for being released from its temporarily fixed position within the housing and transferred to the container.

The filter unit, the filter membrane and the container may be as described above.

In an embodiment, the filter membrane is at least about 2% transparent for the selected scanning wavelength, preferably the filter membrane is at least about 10% transparent, such as at least about 50% transparent for at least one scanning wavelength when immersed in water and/or immersed in a selected medium. The selected medium may be as described above.

In an embodiment, the filter membrane is of a material having a refractive index in dry condition of less than about 1.5, such as between 1.25 and 1.38, such as between 1.3 and 1.35 at a selected scanning wavelength, preferably in the visible range and/or at the wavelength 589.29 nm.

Filter membrane may be of a single material or a combination of materials.

The filter membrane advantageously have a transparency and a refractive index selected such that when the filter membrane is immersed in the medium a scanning and image analyzing procedure comprising a wave property scanning selected from a scanning of phase velocity, group velocity dispersion, wave dispersion, wave front, wave phase, group delay dispersion or time-of flight of at least one wavelength will reveal if a microorganism with a cell dimension, such as a length-scale of 0.6-0.7 μm is present on the membrane or not. The microorganism may be as described above The filter membrane may for example be of one or more glasses, one or more ceramics, one or more semiconductor materials, one or more metals or any combination comprising one or more of the mentioned.

The filter membrane is preferably of polymer material. Examples of suitable materials for the filter membrane comprises polytetrafluoroethylene (PTFE), copolymer of tetrafluoroethylene (TFE), Cytop, perfluorodimethyledioxole (PDD) and any combination comprising a least one of these.

It has been found that filter membranes of inorganic material may not provide a desired transparency for performing an effective optical scanning. Although filter membranes of inorganic material may be provided as very thin and thin walled filter membranes, so that they may appear to have a relative low refractive index in wetted condition, the actual refractive index (i.e. in non-wetted condition) main remain high and may cause a scanning to be less sharp relative to applying a polymeric filter membrane.

The filter membrane advantageously has a thickness of from about 0.05 μm to about 0.5 cm, such as from about 1 μm to about 1 mm, such as from about 10 μm to about 500 μm, such as from about 30 μm to about 100 μm. In an embodiment, the thickness is 50 my or less.

The cut-off size of the filter membrane is advantageously selected depending on the desires biological activity to determine.

In an embodiment, the filter membrane has a cut off size of about 0.01 μm to about 500 μm, such as from about 0.05 μm to about 300 μm, such as from about 0.1 μm to about 100 μm.

The membrane may advantageously have an essentially flat front face and preferably an essentially flat rear face.

The filter membrane may e.g. be produced be a method comprising biaxially stretching a sheet of polymer e.g. by the method described in U.S. Pat. No. 4,049,589.

To ensure that the filter membrane is held in a stable position, the collar is advantageously rigid at 20°. The collar is preferably of a polymer material, such as a polymer material that is compatible with the filter membrane material. The collar may e.g. be mechanically fixed, be glued or be welded to the filter membrane.

In an embodiment, the filter housing comprises a front part and a rear part. The front part and the rear part may be releasable mounted to each other for forming the housing. Advantageously the rear part is adapted for holding the filter unit in the temporarily fixed position. Preferably, the front part and the rear part are adapted for being mounted to each other for holding the filter unit in the temporarily fixed position within the housing.

The rear part of the filter housing advantageously comprises a release arrangement for releasing the filter unit from its temporarily fixed position. Thereby the filter unit may be transferred to the container in a very simple way with reduced risk of contaminating the filter unit. Preferably, the rear part is adapted for mechanically holding the filter unit in the temporarily fixed position and preferably, the release arrangement is adapted for mechanically releasing the filter unit from its temporarily fixed position.

In a variation thereof the front part of the filter housing is adapted for holding the filter unit in the temporarily fixed position and the front part is adapted for mechanically holding the filter unit in the temporarily fixed position and the release arrangement is adapted for mechanically releasing the filter unit from its temporarily fixed position at the front part.

The inlet in the filter housing for feeding a fluid sample into the housing is preferably located in the front part of the filter housing. Preferably, an outlet for the filtered sample is located in the rear part of the housing. Thereby the filtered sample may be discharged in a simple way. Alternatively, the rear part of the housing comprises a discharge collector for collecting the filtered sample. The sample may then later be disposed or the entire housing may be disposed where it is for single time use.

However, it is desired that the housing is of a material that may be autoclaved, dry heat sterilized, or ethylene oxide sterilized, Electron beam sterilized and/or sterilized by gamma irradiation, such as sterilization compatible polymers, ceramics, glass, metals or any combinations thereof.

Advantageously the housing is of or comprises a material is of a serializable polymer material, such as Polyglycolic acid (PGA), Ethylene propylene (diene-) terpolymer (EPDM), Silicones, Polyvinylidene difluoride (PVF2), Polyvinyl fluoride (PVF), Ethylene tetrafluoroethylene (ETFE), Ethylene chlorotrifluoroethylene (ECTFE), Fluorinated ethylene propylene (FEP), Perfluoro alkoxy (PFA), Polysulfones (PSU), Polyphenylene sulfide (PPS), Liquid crystalline polymer (LCP), Polyetheretherketone (PEEK), High heat polycarbonates (PC), Acetals (POM), Polypropylene copolymers (PPC), Polypropylene (PP), Aromatic Polyamides (AP) or any combinations thereof.

In an embodiment, the release arrangement is a spring-loaded release arrangement comprising at least one spring. Preferably the at least one spring is in an unloaded position when the filter unit is held in its temporarily fixed position.

Thereby the filter unit may in a simple way be removed from the housing by separating the rear part from the front part and thereafter the filter unit may be placed in the container using the rear part of the housing and when the filter unit has reached the container the spring may be compressed to release the filter unit from the rear part of the housing.

The container preferably has a substantially flat bottom a convex bottom. A flat bottom may be preferred for having only a very small volume of medium between the filter membrane and the container bottom.

The container has advantageously inner wall dimensions adapted to an outer periphery of the collar of the filter unit. Thereby the filter unit may be placed with a high accuracy.

In an embodiment, the container bottom has an inner face in conformity with the front face of the filter membrane, when the filter is arranged in the container.

Advantageously the container bottom is at least 2% transparent for the selected scanning wavelength, preferably the container bottom is of an optical grade polymer, such as polycarbonate (PC), PMMA, Polystyrene (PS), Polyethylene (PE), Ionomer Resin, Cyclic Olefin Copolymers, Amorphous Copolyester (PETG) and/or Polyethylene Terephthalate (PET). In an embodiment, the container bottom is of glass and/or ceramic material.

The container may advantageously form part of a multi container plate, such as a multi well plate. Thereby several filter membranes may be scanned consecutively.

In an embodiment, the membrane filter comprises two or more laterally located filter membranes. The each of the laterally membrane may for example be surrounded by and separated and preferably separated from each other by the collar arrangement. Thereby several determinations may be performed using one single filter unit. The system may for example further comprises a container separator adapted for dividing the container into lateral sections correlating to the respective filter membranes of the laterally located filter membranes. Thereby it may be possible to subject one of the laterally located filter membranes to one medium and/or additional substance and another one of the laterally located filter membranes to another medium and/or additional substance.

In an embodiment, the laterally located filter membranes are identical.

In an embodiment, the laterally located filter membranes differs in at least one property, such as in thickness, in cut off size in structure or in refractive index.

The filter membrane may advantageously comprise optically detectable marks located at predefined positions, such as at positions defining a coordinate system.

This may help the 3D scanning system find the focus of the filter.

For example, a preview may be used to establish a scan profile that ensures the best focus is achieved in each subsequent hour lapse measurement.

Marks in the filter may further be used to align images from different time recordings especially where the filter may be displaced due to evaporation of the medium Marks may further be used as 'Coordinate System' to find colonies for further analysis. Color calibration marks can serve to correct for the color of the medium and thus improve spectral analyzes.

In an embodiment, the system further comprises a pre-filtering unit comprising a pre-filtering membrane having a cut off size larger than the filtering unit. Such pre-filtering unit may be used where the fluid sample have many particles, such both larger and smaller particles e.g. as described for the method above. The housing may be adapted to hold the pre-filtering unit in front of the filter unit. The pre-filtering unit may for example be held in a temporarily fixed position by the front part of the housing. Preferably, the front part is adapted for mechanically holding the pre filtering unit in the temporarily fixed position and comprises a spring activatable release arrangement e.g. as described for the rear part above.

The system may further comprise at least one medium. Preferably the at least one medium has a medium refractive index where the refractive index difference (RID) between the filter reference index and the RID is less than about 0.25, such as less than about 0.1, such as less than about 0.05, such as less than about 0.025, such as less than about 0.01 at the selected scanning wavelength and/or at the wavelength 589.29 nm.

The system may further comprises a scanning and image analyzing system adapted for performing a 3D reflection scanning and image analyzing procedure of the filter membrane from its front face using at least one selected scanning wavelength in the visible range comprises acquiring a plurality of images along a scanning path. The scanning and image analyzing system may e.g. be as described above.

All features of the inventions including ranges and preferred ranges can be combined in various ways within the scope of the invention, unless there are specific reasons not to combine such features.

BRIEF DESCRIPTION OF THE EXAMPLES AND DRAWING

The invention is being illustrated further below in connection with preferred embodiment and with reference to the figures. The figures are schematic and may not be drawn to scale.

FIG. 1a is a top view of a filter unit suitable for the method of the invention.

FIGS. 1b and 1c illustrated filter units comprising laterally located filter membranes.

FIGS. 10a-10c show an example of scanning results of water bacteria collected and cultivated on a PTFE filter.

FIGS. 11a-11b show an example of a scanned image of water bacteria collected and cultivated on a PTFE filter.

FIGS. 12a-12d illustrate a sequence of steps of an example of a method of the invention.

Figure 2:
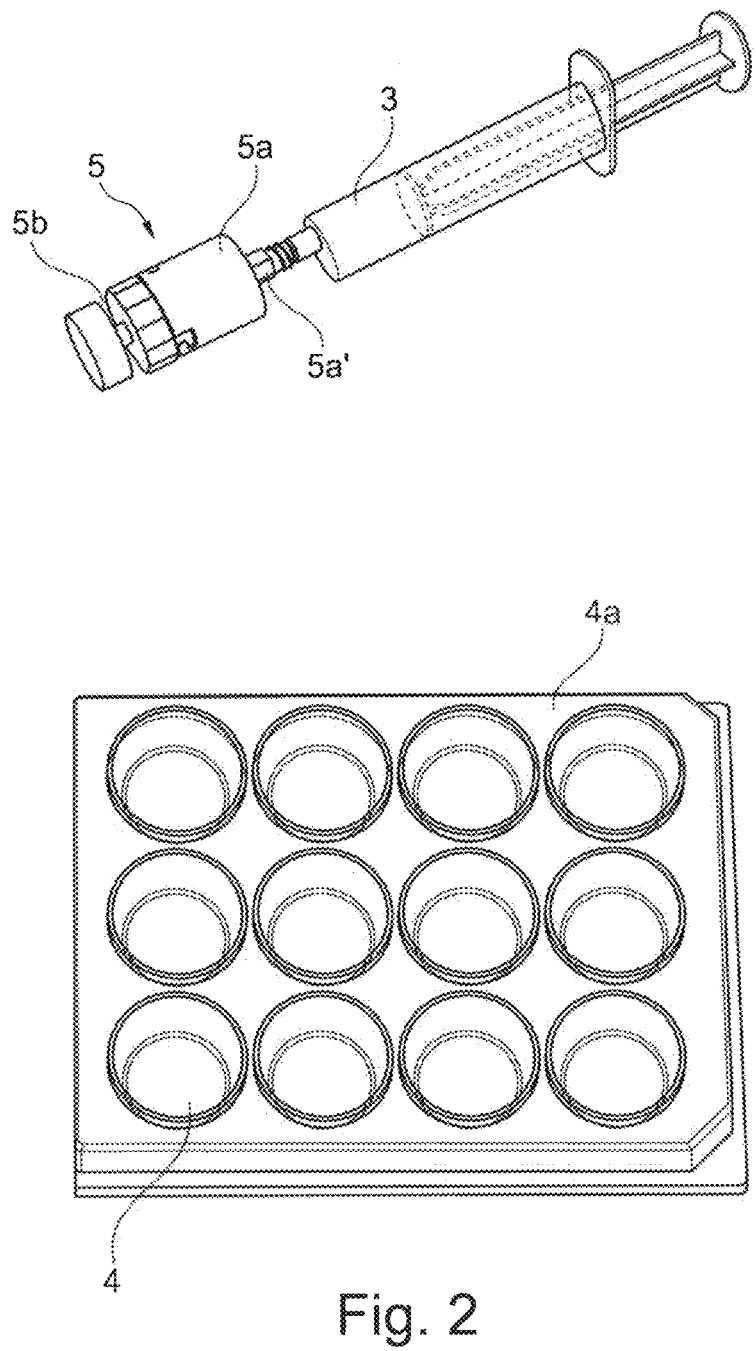
FIG. 2 is a perspective view of a system of the invention comprising a filter housing holding a not shown filter unit, a syringe and a container adapted for the filter unit.

The filter unit illustrated in FIG. 1 comprises a filter membrane 1 and a collar arrangement 2 surrounding the filter membrane. As described above the filter membrane advantageously is substantially flat and comprises a front face and a rear face.

The filter units shown in FIGS. 1b and 1c comprise laterally located filter membranes 1a-1d. The filter unit of FIG. 1b comprises two laterally located filter membranes 1a and 1b. The laterally located filter membranes 1a and 1b are both surrounded by a collar arrangement 2a, 2b, wherein a first part of the collar arrangement 2a defines the periphery of the filter unit and a second part of the collar arrangement 2b defines a cross separation between the two laterally located filter membranes 1a, 1b.

The filter unit of FIG. 1c comprises four laterally located filter membranes 1a, 1b, 1c, 1d. The laterally located filter membranes 1a, 1b, 1c, 1d are all surrounded by a collar arrangement 2a, 2b, wherein a first part of the collar arrangement 2a defines the periphery of the filter unit and a second part of the collar arrangement 2b defines two cross separations between the four laterally located filter membranes 1a, 1b, 1c, 1d.

The laterally located filter membranes may be arranged in any desired configuration.

To ensure an evenly filtration over the various laterally located filter membranes, it may be desired that the flow resistance over the respective laterally located filter membranes are substantially equal. The filter unit with laterally located filter membranes ensures that several determinations may be performed using one single filter unit e.g. as described above.

The system shown in FIG. 2 discloses an example of a filter housing 5 holding a not shown filter unit, a syringe 3 and a container 4 adapted for the filter unit.

The filter housing 5 comprises a front part 5a and a rear part 5b. The not shown filter unit is held in a temporarily fixed position between the front part 5a and the rear part 5b of the filter housing.

The syringe 3 is arranged to feed a fluid sample into an inlet 5a1 of the front part 5a of the filter housing 5. As explained above the sample may be driven through the filter membrane by any means and hence the syringe is an optional part of the system. The container 4 is a part of a container plate 4a comprising a plurality of containers, such as wells.

Figure 3:
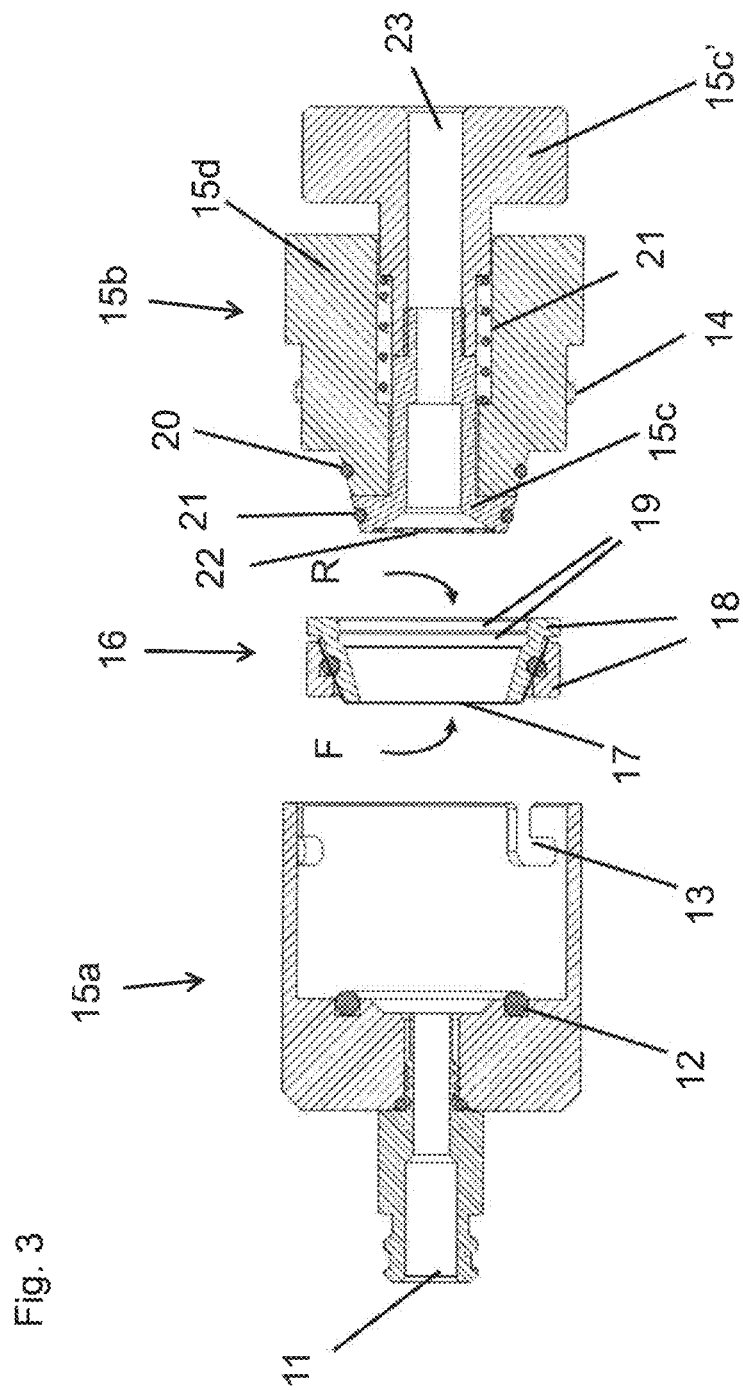
FIG. 3 is a cross sectional view of a filter housing and a filter unit.

In FIG. 3, an example of a filter housing 15a, 15b and an example of a filter unit 16 are shown in more details.

The filter unit comprises a filter membrane 17 with a front face F and a rear face R and a collar arrangement 18 surrounding the filter membrane 17. The collar arrangement 18 extends beyond the rear face R of the filter membrane 17 to form a mounting arrange 19, for being mechanically held in a temporarily fixed position by the rear part 15b of the filter housing.

The filter housing comprises a front part 15a and a rear part 15b. The front part 15a comprises an inlet 11, for example shaped with a LUER coupling suitable for a syringe or other means for injecting a fluid sample. Inside the front part 15a of the filter housing, a gasket 12 is arranged, such that when the filter housing is assembled with the filter unit 16, the collar arrangement 18 of the filter unit seal against the gasket 12 of the front part 15a. The front part further comprises a number of sliding frames 13 (only two are shown) of a locking arrangement for locking the front part 15a to the rear part 15b.

The rear part 15b of the filter housing comprises a first and a second displaceable portions 15c and 15d and a spring arrangement 21 arranged to hold the first and the second displaceable portions 15c and 15d and thereby to provide a release arrangement is adapted for mechanically releasing the filter unit from its temporarily fixed position at the rear part.

The rear part 15b of the filter housing comprises a gasket 19 located at the first portion 15c, which will seal against the inner side of the collar arrangement 18 when the filter housing is assembled with the filter unit 16. A support structure 22 is arranged to support the filter membrane and to ensure that the filter membrane do not deform or burst when the fluid sample is pressed through the filter membrane 17. At the second portion 15d is located a click on and/or friction structure 20, adapted to be mated with the mounting arrangement 19, for mechanically holding the filter unit in a temporarily fixed position.

The first portion 15c comprises a rear most flange 15c' and when pulling the second portion 15d towards the rear most flange 15c' the filter unit when held at its temporarily fixed position by the rear part 15b, will be released from this position. At the same time, the spring arrangement 21 is depressed. The filter unit 16 is not released until the spring arrangement 21 is depressed. Thereby the spring arrangement 21 ensures that the filter unit 16 is safely held in its temporarily fixed position until actively released therefrom.

The second portion 15d of the rear portion 15b of the filter housing further comprises a number projecting locking elements 14 of the locking arrangement, adapted to be mated with the same number of sliding frames 13 of the front part 15a for locking the front part 15a to the rear part 15b. The locking elements 14 may be inserted to the sliding frames 13 by a twist, and held in that position for as long as desired. When the locking arrangement is in its locked position the first and the second displaceable portions 15c and 15d are held in a fixed relation to each other.

The rear part 15b further comprises an outlet 23, through which the filtered sample may escape. As mentioned, the rear part 15b could instead comprise a collecting chamber for collecting the filtered sample or an additional disposable collection chamber could be temporarily mounted to the rear portion 15b for collecting the filtered sample.

Figure 4:
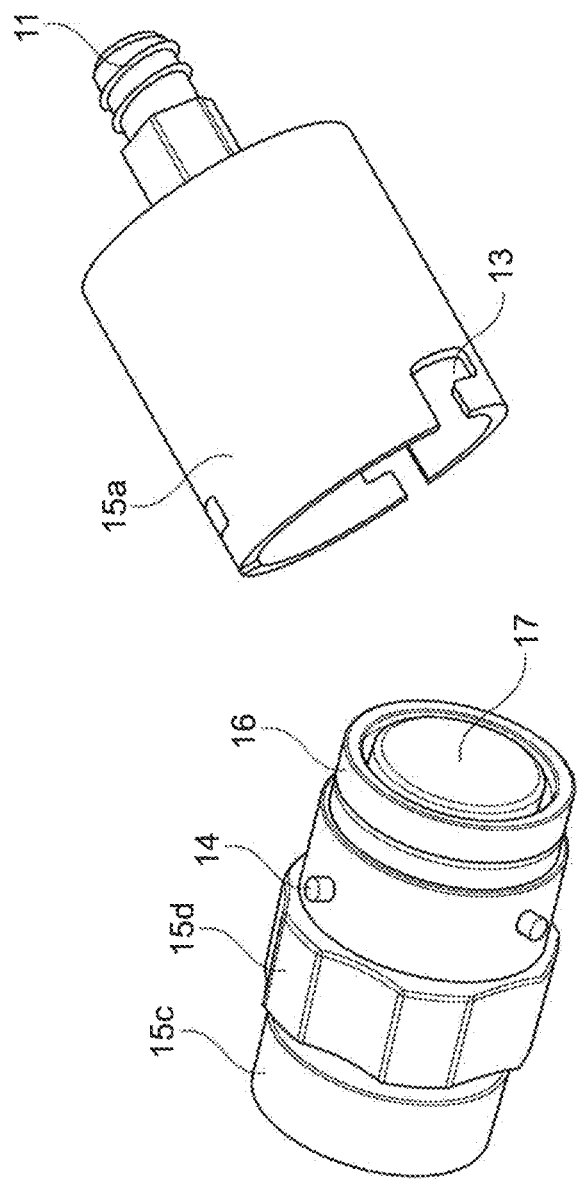
FIG. 4 is a perspective view of a filter housing and a filter unit.

In FIG. 4, the filter housing and the filter unit as seen in perspective. The reference numbers are as for FIG. 3.

Figure 5:
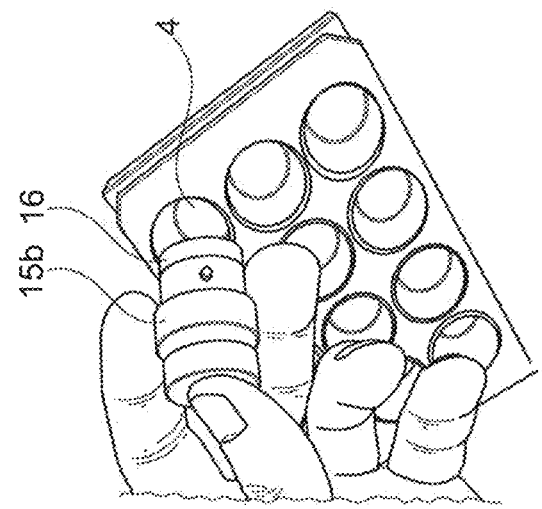

FIGS. 5-8 illustrates the step of applying the filter in the container. In FIG. 5 the rear part 15b of the filter housing has been demounted from the not shown front part of the filter housing. The filter 16 is held in its temporarily fixed position to the rear part 15b and the user is about to applying the filter unit in the container 4.

Figure 6:
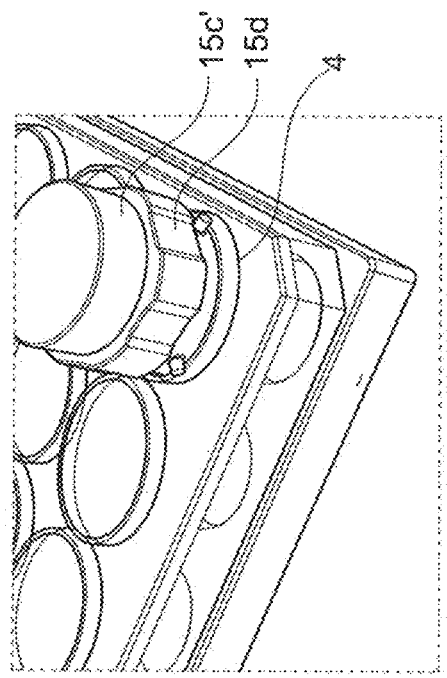
FIGS. 5-8 illustrates the step of applying the filter in the container.

In FIG. 6. The user has inserted the filter unit together with a part of the rear part 15b into the container 4 and depressed the spring arrangement to release the filter unit 16 from the rear part 15b.

Figure 7:
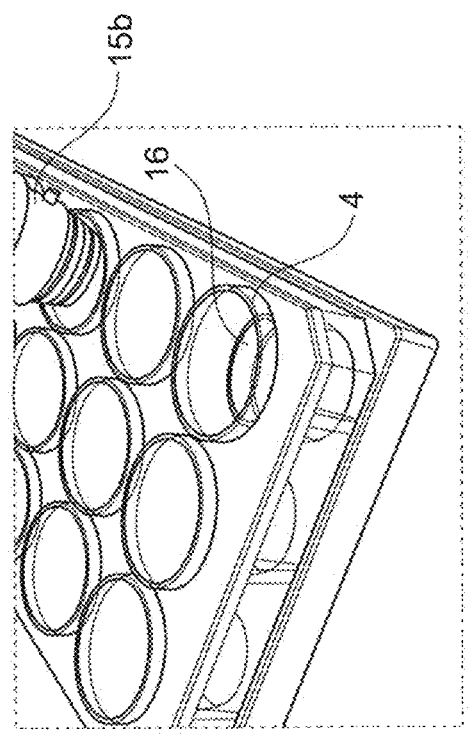

In FIG. 7, it can be seen that the filter unit 16 have been released and the user is removing the rear part 15b.

Figure 8:
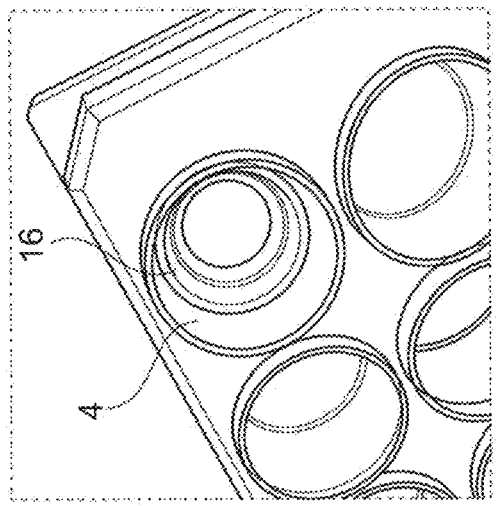

In FIG. 8, the filter unit 16 is now ready for adding the medium.

Figure 9:
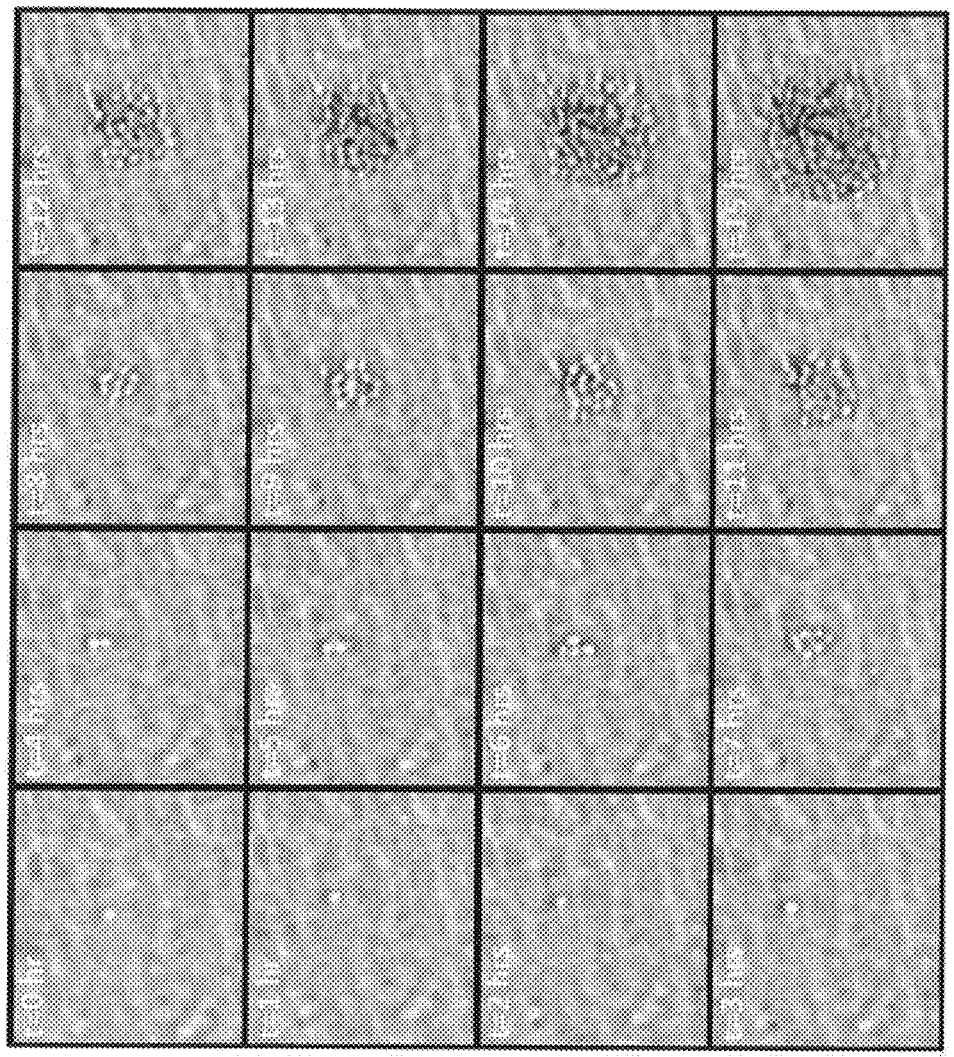
FIG. 9 illustrates images of a time lapse series.

FIG. 9 shows an example of a time lapse image series of a single bacterium forming a colony during 15 hours on a membrane filter.

The depicted bacterium is one among many bacteria collected from a fluid sample on a PTFE filter (pore cut off size: 0.2 μm) and embedded in PCA medium (Principal Components Analysis medium).

The image series clearly illustrates the transition from a single bacterium to a micro-colony forming unit by multiplications.

Figure 10A:
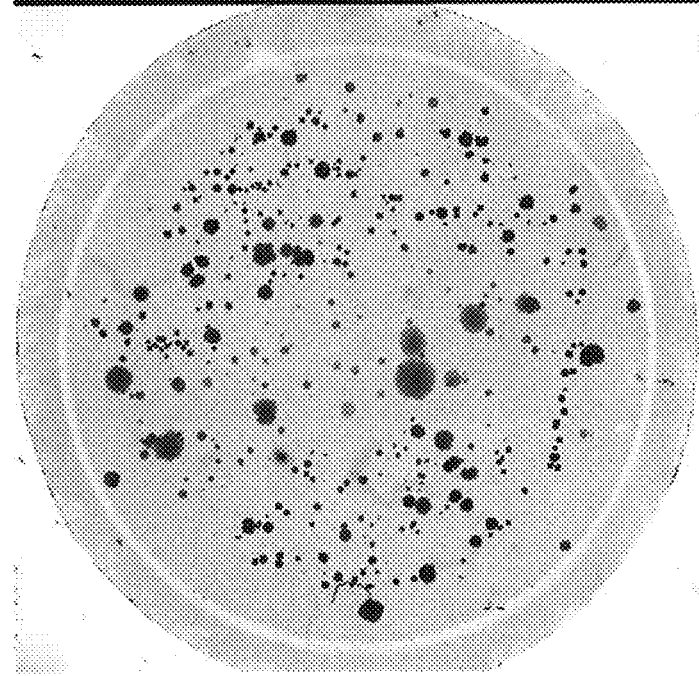
Figure 10B:
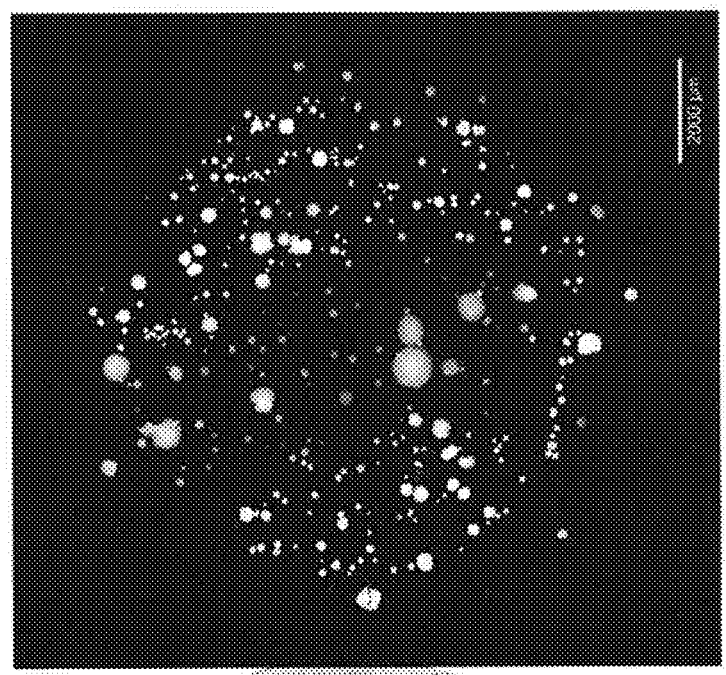

FIG. 10a shows an example of a scanned image of water bacteria collected and cultivated on a PTFE filter after 5 hours of growth. The bacteria were collected on the PFTE filter and embedded in WPCA medium (Water Plate Count Agar). The filter parameters are: Pore cut off size of 0.2 μm and diameter of 13 mm.

FIG. 10a shows a background scan subtracted (or corrected) image of the scanned filter image in 10a. The corrected image enhances the temporal changes developed since the time lapse image 1 was recorded (first time-lapse scanned image). The first time-lapse image was applied as background subtraction image.

FIG. 10c shows a plot of the CFU concentration as function of cultivation time detected by bacterial growth on filter. Note the small drop in CFU after 8 hours. This drop is due to fission of some colonies.

FIG. 11a shows an example of a scanned image of water bacteria collected and cultivated on a PTFE filter after 6 hours of growth. The bacteria were collected on the PFTE filter and embedded in WPCA medium. The filter parameters are: Pore cut off size of 0.2 μm and diameter of 13 mm.

FIG. 11a shows a detail of the scanned image, illustrating the heterogeneity of cell forming units on the filter.

FIGS. 12a-12d show a sequence of steps of an example of a method of the invention. In FIG. 12, the filter unit is mounted in the filter housing 15 and a fluid sample is passed into the housing 12 via the inlet 11 and out of the housing 15 via the outlet 23.

In FIG. 12b, the filter unit 16 has been withdrawn from the filter housing. In a container 4 a layer of medium M has been applied and the filter unit 16 has been placed in the container 4 with the front face facing the bottom of the container 4. A scanning and image analyzing systems comprising an illumination device (light emitter) 24 and an image acquisition device 25 has been arranged to perform a scanning and image analyzing procedure of the filter membrane using at least one selected scanning wavelength.

FIG. 12c illustrates two series if images from two subsequent scans.

FIG. 12d illustrates a result of determined biological activity showing colony-forming unit (CFU) per mL sample as a function of time in hours.

The invention claimed is:

1. A method for analyzing a fluid sample for a biological activity, the method comprising
providing a filter unit comprising a membrane having a thickness, a front face, and a rear face,
passing the fluid sample through the filter membrane from its front face,
applying the filter unit in a container,
adding a medium into the container, and
performing a scanning and image analyzing procedure of the filter membrane using at least one selected scanning wavelength,
and wherein the scanning is an optical 3D scanning and comprises acquiring a plurality of images along at least one scanning path, wherein the 3D scanning comprises scanning through at least a part of the filter membrane thickness, such as scanning through the entire filter membrane thickness and optionally scanning through the entire filter membrane thickness and including at least a volume of the medium located adjacent the front face of the membrane.

2. The method of claim 1, wherein the scanning comprises a time-lapse series scanning, the time-lapse series scanning comprises comparing each of a number of subsequent scans with one or more scans that is/are previous scan(s) to said respective subsequent scan.

3. The method of claim 1, wherein said filter membrane is of a material having a refractive index of less than about 1.5 at a wavelength selected from the selected scanning wavelength and 589.29 nm.

4. The method of claim 1, wherein said filter membrane is of a material having a filter membrane refractive index and said medium has a medium refractive index where the refractive index difference (RID) between said filter membrane reference index and said medium refractive index is less than about 0.35 at a wavelength selected from the selected scanning wavelength and 589.29 nm.

5. The method of claim 1, wherein the 3D scanning comprises scanning through at least a part of the filter membrane thickness.

6. The method of claim 5, wherein the 3D scanning comprises scanning through the entire filter membrane thickness and including at least a volume of the medium located adjacent the front face of the membrane.

7. The method of claim 1, wherein the scanning and image analyzing procedure comprises performing consecutively scans along the scanning path and for each scan generating a set of acquired images,
wherein the scanning and image analyzing procedure comprises performing a background scan along the scanning path and generating a set of background images and
wherein the scanning and image analyzing procedure comprises processing each set of acquired images by a method comprising subtracting pixel values of said respective background images from corresponding pixel values of the respective acquired images of said set of acquired images.

8. The method of 7, wherein each set of acquired images is associated with a time attribute representing the time of acquiring a selected one of the images, to provide that the sets of image generated from the consecutive scans represent sets of acquired images as a function of time.

9. The method of claim 1, wherein the scanning and image analyzing procedure comprises at least one of bright field microscopy, dark field microscopy, fluorescence microscopy, hyperspectral scanning and imaging, hyperspectral microscopy, Raman spectroscopy, light transmission scanning and/or light reflection scanning.

10. The method of any one of claim 1, wherein the at least one selected wavelength comprises one or more excitation wavelength for excitation of a fluorophore selected from a fluorophore present in the medium, a fluorophore expected to be generated in the medium upon microbial activation or a fluorophore of a biofluorescence active microorganism expected in the sample.

11. The method of claim 1, wherein the scanning and image analyzing procedure comprises determining at least one parameter selected from a morphological parameter a temporal parameter of one or more microorganism and/or colonies.

12. The method of claim 1 wherein the 3D scanning is performed using two or more selected scanning wavelength and wherein the image analyzing procedure comprises a spectral analysis, such as a multiplexing between said two or more wavelength.

13. The method of claim 1, wherein the container comprises a bottom and a wall defining an open top, wherein at least a part of the medium is added prior to applying the filter unit in the container and wherein the application of the filter unit in the container comprises applying the filter unit in the container with the front face of the filter membrane facing a bottom of the container, wherein the container bottom is at least 50% transparent for said selected scanning wavelength and wherein the 3D scanning is performed from the front face of the filter membrane.

14. The method of claim 1, wherein the container comprises a bottom and a wall defining an open top, wherein at least a part of the medium is added after application of the filter unit in the container, wherein the application of the filter unit in the container comprises applying the filter unit in the container with the rear face of the filter membrane facing the bottom of the container and wherein the 3D scanning is performed from the open top.

15. The method of claim 1, wherein the medium is added in liquid form.

16. The method claim 1, wherein the method further comprises adding an additional substance to the container, the additional substance is preferably a biocide and/or an antibiotic.

17. The method of claim 1, wherein the method comprises determining a characteristic as a function of time of the filtrate collected by the filter membrane.

18. The method of claim 1, wherein the scanning and image analyzing procedure comprises performing said consecutive scans and generation of sets of acquired images, wherein a first scan is a reference scan, after each subsequent scan processing the subsequent set of acquired images by a method comprising subtracting pixel values of respective background images from corresponding pixel values of the respective images of said set of subsequent acquired images, synthesizing at least one resulting image and analyzing said resulting image for indication of living microorganism and/ or a characteristics of a detected living microorganism.

19. The method of claim 1, wherein the method comprises analyzing a plurality of fluid samples obtained from the same mother sample, wherein at least two of the liquid samples are subjected to different medium and/or additional substance and the method comprises comparing resulting images from the analysis of the respective fluid samples, preferably the method comprises comparing timely corresponding resulting images from the analysis of the respective fluid samples.

* * * * *